United States Patent Office 3,029,123
Patented Apr. 10, 1962

3,029,123
DYESTUFFS AND METHOD FOR THE DYEING AND PRINTING OF TEXTILE MATERIALS CONTAINING HYDROXYL GROUPS
Rolf Pütter, Dusseldorf, and Alfons Dorlars and Edgar Enders, Leverkusen, Germany, assignors to Farbenfabriken Bayer Aktiengesellschaft, Leverkusen, Germany, a corporation of Germany
No Drawing. Filed Sept. 26, 1958, Ser. No. 763,482
Claims priority, application Germany Oct. 14, 1957
7 Claims. (Cl. 8—54.2)

The present invention relates to new dyestuffs, to a process for their manufacture and to a method for the dyeing and printing said new dyestuffs onto textile materials containing hydroxyl groups; more particularly it relates to dyestuffs having the formula

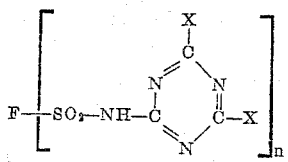

In this formula F stands for the residue of an organic dyestuff, one X means a halogen atom and the other X stands for a halogen atom or a hydroxyl group, and $n$ denotes a whole number from 1 to 4.

The new dyestuffs are obtainable by reacting dyestuffs having at least one and not more than four sulfonamide groups, with trihalotriazines, particularly cyanuric chloride. In this reaction the sulfonamide group is substituted by the triazine radical with the splitting off of hydrogen halide. One of the two remaining halogen atoms may be replaced by a hydroxyl group if the reaction mixture or the solution of the dyestuff is kept alkaline for some time.

For the synthesis of the new products dyestuffs of various types containing sulfonamide groups may be used such as azo dyestuffs and their metal complex compounds, anthraquinone dyestuffs, oxazine dyestuffs, dioxazine dyestuffs, phthalocyanines or triphenyl methane dyestuffs.

According to another method the dyestuffs may be built up in such a manner that a dyestuff intermediary substituted by one to four sulfonamide groups is first reacted with cyanuric halide with acylation of the sulfonamide group and the intermediate product thus obtained is then used in known manner for the manufacture of the dyestuffs.

In addition to triazinyl-sulfonamide groups, the dyestuffs may also contain further substituents, for example sulfonic acid, carboxylic acid, hydroxy, alkoxy, amino, acylamino groups or halogen. Particularly valuable products are obtainable by substitution with haloacylamino groups. The triazinyl-sulfamide group has an acid character, appears in a neutral or also weakly acid solution as anion and thus imparts to the dyestuff a certain water-solubility. The halogen atoms present in the triazine ring show at room temperature only a moderate reactivity to water, alcohols and amines.

Under suitable conditions the new dyestuffs yield dyeings and prints of excellent fastness to washing on various animal, vegetable and synthetic textile materials. When dyeing cotton, it is advantageous to pad the material with the dyestuff solution and to fix the dyestuff by a subsequent heat treatment in the presence of alkali. Presumably, the dyestuffs enter into a chemical bond with reactive groups of the various fibres via the triazine ring with the splitting off of hydrogen halide. The linkage with wool and polyamide fibres probably takes place via amino groups and to cellulose materials via hydroxyl groups.

In order to carry out the dyeing on materials containing hydroxyl groups such as cotton and regenerated cellulose, the dyestuff is caused to draw on the dyeing material from an aqueous solution at room temperature or with heating. An addition of common salt or Glauber's salt to the dye-liquor promotes the enrichment of the dyestuff on the fibre. For fixation of the dyestuff, the liquor may be rendered alkaline from the start. In spite of the reactive groupings, the aqueous alkaline dyestuff solutions show a sufficiently stability for practical requirements.

However, it is often found to be more expedient to pass the material, dyed from a neutral solution, through an aqueous alkaline solution to which common salt or Glauber's salt has been added. The addition of salt diminishes the migration of the dyestuff from the fibre. The dyeing is then steamed or dried. A particularly complete fixation is mainly achieved with those dyestuffs according to the invention which are also substituted by a haloacylamino group.

When using the new dyestuffs in the padding process, the dyeing material passes through a solution of the dyestuffs to be used according to the invention. The padding solution may also contain further additives, for example thickeners such as tragacanth, starch, alginate or methyl cellulose; the two last mentioned thickeners yield in most cases deeper dyeings with an otherwise equal composition. In order to improve the solubility of the dyestuff, the addition of urea is often advantageous. The padding solution may also already contain the alkali required for fixation, for example sodium hydroxide solution, sodium carbonate, bicarbonate, trisodium phosphate, sodium acetate. After the padding process, the dyeing material is steamed or dried. When using a padding solution without alkali, the dry material is subsequently passed through an alkaline solution similarly to the dyeing process described above. Fixation and rinsing are carried out as already described.

For the printing of textile containing hydroxyl groups, a printing paste is prepared comprising the dyestuff solution, a thickener and a solution of an alkali. The addition of urea proves often to be advantageous, especially for achieving high dyestuff concentrations. The fixation and rinsing of the prints is effected in the manner described for dyeing and padding.

The dyeing and padding of nitrogen-containing materials such as wool, polyamide and polyurethane fibres is preferably carried out in a weekly alkaline, neutral or weakly acid dye-bath or padding liquor, for example at a pH value between 5 and 7. Here as with the dyeing of fibres containing hydroxyl groups, dyeings are obtained which have good general fastness properties, especially excellent fastness to washing.

The following examples are given for the purpose of illustrating the invention without, however, limiting it thereto.

*Example 1*

48.6 grams of sodium salt of the dyestuff obtainable by coupling diazotized 1-aminobenzene-3-sulfonamide with 6-chloroacetylamino-1-hydroxynaphthalene-3-sulfonic acid, are dissolved in 500 millilitres of water with the addition of 7 millilitres of sodium hydroxide solution $(d=1.38)$ The dyestuff solution is added to a suspension of 18.4 grams of cyanuric chloride obtained by pouring 100 millilitres of an acetonic solution of the cyanuric chloride into 200 millilitres of water and 50 grams of crushed ice. By the slow addition of a further 7 millilitres of sodium hydroxide solution the reaction is kept alkaline. After completion of the reaction, the dyestuff can be precipitated by the addition of common salt. It is filtered off and dried at 50° C. under reduced pressure. The dyestuff thus obtained corresponds in the free acid state to the probable formula

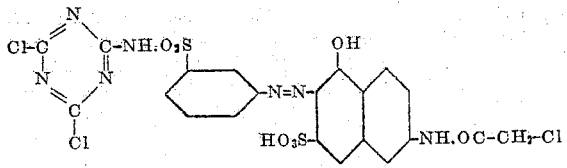

In the same manner 52 grams of the dyestuff obtainable by diazotizing 1-aminobenzene-3-sulfonamide and coupling with 6-acetylamino-1-hydroxynaphthalene-3-sulfonic acid, can be reacted with cyanuric chloride.

*Example 2*

Calico is padded with a solution of 6 grams of the dyestuff obtainable according to Example 1, 5 grams of sodium bicarbonate and 10 grams of urea in 100 milliliters of water and steamed at 105° C. for 10 minutes. The dyeing material is then rinsed with hot water, boiled with a soap solution, finally washed with cold water and dried. The orange dyeing thus obtained is distinguished by an excellent fastness to washing.

*Example 3*

40.6 grams of the dyestuff obtainable by coupling a diazo solution from 1-aminobenzene-3-sulfonamide with 2-hydroxynaphthalene-6-sulfonamide, are dissolved in 700 millilitres of water with the addition of 14 millilitres of sodium hydroxide solution; the solution is cooled to 0° C. 36.8 grams of cyanuric chloride in 250 millilitres of acetone are slowly added dropwise. The mixture is always kept sufficiently alkaline by simultaneously and slowly adding 14 millilitres of sodium hydroxide solution so that phenolphthalein paper is colored red. The temperature is kept at 0° C. by rapidly adding crushed ice. After completion of the reaction, the product is neutralised with a little acid, the dyestuff is precipitated with common salt and dried at 50° C. under reduced pressure. The dyestuff corresponds to the formula

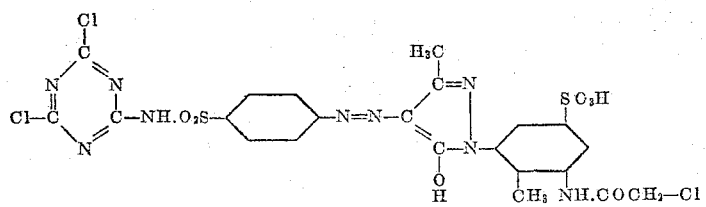

and yields by the working method described in Example 2 orange dyeings which are fast to washing.

If the aqueous solution of the dyestuff is kept alkaline (pH 8–11) for 24 hours at room temperature one of the two chlorine atoms in the triazine nuclei may be replaced by a hydroxyl group.

*Example 4*

A solution of 17.2 grams of 1-aminobenzene-2-sulfonamide, 7 millilitres of sodium hydroxide solution and 12 grams of sodium carbonate are rapidly introduced into a suspension of 18.4 grams of cyanuric chloride in 200 millilitres of water. The temperature is kept at 0° C. by throwing in crushed ice. As soon as the solution is clear, it is treated with 7 grams of sodium nitrite in 40 millilitres of water and the mixture is run at 0° C. into a mixture of 40 millilitres of hydrochloric acid ($d=1.18$) and 50 millilitres of water. The excess nitrous acid is removed by means of a few drops of an amidosulfonic acid solution, the mixture is treated with a solution of 31.4 grams of 6 - chloroacetylamino - 1 - hydroxynaphthalene-3-sulfonic acid in 150 millilitres of water and neutralised by carefully adding dropwise first 10 millilitres of sodium hydroxide solution and then 50 millilitres of a 20 percent sodium acetate solution, until the reaction is weakly acid. The isolated and dry dyestuff corresponds in the free acid state to the probable formula

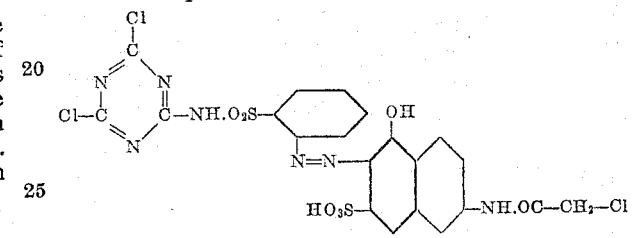

It yields, by the dyeing method described in Example 2, orange dyeings which are fast to washing.

*Example 5*

50 grams of the sodium salt of the dyestuff from diazotized 1-aminobenzene-4-sulfonamide and 1-(2'-methyl-3' - chloroacetylamino - 5' - sulfophenyl) - 3 - methyl - 5-pyrazolone are reacted with 18.4 grams of cyanuric chloride as described in Example 1. After the addition of common salt, the dyestuff of the following formula precipitates first in a greasy form but can readily be filtered after brief stirring. The product yields by the working method described in Example 2 yellow dyeings which are fast to washing.

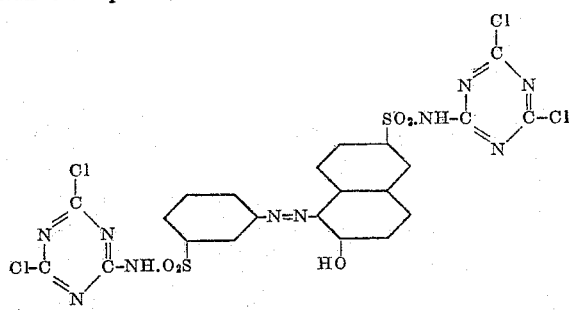

30 grams of the dyestuff obtainable according to this example are worked into a printing paste with 150 grams of urea, 450 grams of sodium alginate solution (40:1000), 20 grams of potassium carbonate and 750 millilitres of water. The prints obtained therewith show, after drying, heating to 120–140° C. for a few minutes, rinsing and soaping, a very good fastness to washing.

Prints of similar depth are obtainable if instead of potassium carbonate as acid binding agent 25 grams of sodium bicarbonate, 30 grams of trisodium phosphate, 10 grams of soda-lye or 15 grams of potassium hydroxyl are used. The fixation can also be carried out by steaming according to the method described in Example 2.

*Example 6*

73.9 grams of the 1:2 chromium complex of the monoazo dyestuff 2-amino - 1 - hydroxybenzene-4-sulfonamide →2-hydroxynaphthalene are dissolved in 500 millilitres of water and 14 millilitres of sodium hydroxide solution ($d=1.38$). A solution of 36.8 grams of cyanuric chloride in 200 millilitres of acetone is run into this solution at 0° C. The reaction is kept alkaline by the slow addition of a further 14 millilitres of sodium hydroxide solution. The dyestuff is then precipitated from its solution by rapidly adding common salt, filtered and dried at 50° C. under reduced pressure. It corresponds to the formula

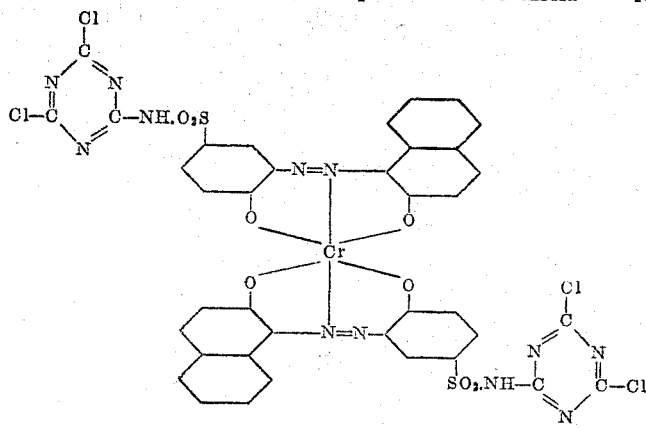

and yields on cotton dyed according to the instructions of Example 2 currant shades which are fast to washing.

The corresponding cobalt complex yields on cotton bordo shades.

Example 7

62.6 grams of the monoazo dyestuff 2-aminobenzene-1-sulfonic acid - (4' - sulfonamido - phenyl)-amide→1-(2'-chloro-5'-sulfophenyl)-3-methyl-5-pyrazolone are reacted, as described in the preceding examples, with 36.8 grams of cyanuric chloride dissolved in 250 millilitres of acetone, at pH 10–10.5. The dyestuff thus obtained yields on cellulose fibres yellow dyeings which are fast to washing after fixing according to the instructions of Example 2.

The diazo component used in this example is obtainable by condensation of 2-nitrobenzene-1-sulfonic acid chloride with 1-aminobenzene-4-sulfonic acid amide in an aqueous weakly acid medium and subsequent reduction of the nitro group with iron powder to give the amino group. For carrying out the diazotization, 32.7 grams of 2-amino-benzene-1-sulfonic acid - (4' - sulfamido - phenyl)-amide (M.P. 161–162° C.) are finely ground and suspended in water with the addition of a wetting agent, for example the sulfuric acid semi-ester of stearyl alcohol. After the addition of 50 millilitres of hydrochloric acid ($d=1.8$) an aqueous solution of 7 grams of sodium nitrite is slowly added dropwise as and when it is used up. The azo coupling is effected in usual manner in a soda-alkaline solution.

Finely ground cyanuric chloride need not first be dissolved in acetone for these reactions. It is rather possible to sprinkle the whole amount in one portion into the dyestuff solution to which a small quantity of a wetting agent is expediently added. The progress of the reaction can be ascertained by the consumption of sodium hydroxide solution required for maintaining the pH value of 10–10.5.

Example 8

63.4 grams of the monoazo dyestuff 2-amino-5-acetylamino-benzene-1-sulfonic acid-(4'-sulfamidophenyl)-amide ⟶ 1-hydroxy-7-aminonaphthalene-3-sulfonic acid are reacted, in a similar manner to that described in the preceding examples, with 36.8 grams of cyanuric chloride dissolved in 250 millilitres of acetone at a pH 10–10.5. The dyestuff thus obtained yields on cellulose fibres red dyeings which are fast to washing according to the instructions of Example 2.

The diazo component used for the manufacture of this dyestuff is obtainable in the following manner: 5-nitro-2-chlorobenzene-1-sulfonic acid chloride is condensed with 1-aminobenzene-4-sulfonic acid amide in an aqueous weakly acid medium at 70–90° C. By heating with a 20 percent aqueous ammonia in an autoclave to 120° C. for 5 hours, 5-nitro-2-aminobenzene-1-sulfonic acid-(4'-sulfamido-phenyl)-amide is obtained which is reduced with iron powder to the 2,5-diaminobenzene-1-sulfonic acid-(4'-sulfamido-phenyl)-amide. The latter yields on acetylation with acetic anhydride in an aqueous medium at a pH 4–5, the 2-amino-5-acetylaminobenzene-1-sulfonic acid-(4'-sulfamido-phenyl)-amide (M.P. 239° C.). For the diazotization, 38.4 grams of the product are finely ground and suspended in water. After the addition of 40 millilitres of hydrochloric acid, an aqueous solution of 7 grams of sodium nitrite is slowly run into the suspension. The coupling to the azo dyestuff is effected in usual manner in a weakly acid medium.

In a similar manner the following dyestuffs substituted by sulfonic acid amide groups are reacted with cyanuric chloride; the dyestuffs thus obtained dye cellulose-containing materials according to the instructions of the preceding examples in the indicated shades.

| Dyestuff | Shade of fixed dyeing on cellulose-containing materials |
|---|---|
| 1:2 Cobalt complex of the monoazo dyestuff 2 - amino - 1 - hydroxybenzene - 4 - sulfonic acid amide ⟶ 1 - phenyl - 3 - methyl - 5 - pyrazolone. | yellow brown. |
| 1:2 Chromium-complex of the same monoazo dyestuffs. | orange. |
| Mixed chromium-complex of the monoazo dyestuffs 2 - amino - 1 - hydroxybenzene - 4 - sulfonic acid amide ⟶ 2 - hydroxynaphthalene and 2 - amino - 1 - hydroxybenzene - 4 - sulfonic acid amide ⟶ 1-phenyl-3-methyl-5-pyrazolone. | brown. |
| 4-Aminobenzene-1-sulfonic acid amine ⟶ 1 - (2' - chloro - 5' - sulfophenyl) - 3 - methyl - 5-pyrazolone. | yellow. |
| 3-Aminobenzene-1-1-sulfonic acid amide ⟶ 1 -)2' - chloro - 5' - sulfophenyl) - 3 - methyl - 5-pyrazolone. | Do. |
| 3-Aminobenzene-1-sulfonic acid amide ⟶ 1 - (3' - sulfamidophenyl) - 3 - methyl - 5 - pyrazolone. | Do. |
| 2-Aminobenzene-1-sulfonic acid-(4'-sulfamidophenyl)-amide ⟶ 1-(3'-sulfamidophenyl)-3-methyl-5-pyrazolone. | Do. |
| 2-Aminobenzene-1-sulfonic acid-(4'-sulfamido-acid phenyl) - amide ⟶ 1 - hydroxy - 7 - amino - naphthalene-3,6-disulfonic acid. | red. |
| 3-Aminobenzene-1-sulfonic acid amide ⟶ 1 - hydroxynaphthalene - 3 - sulfonic acid - 8 - sulfonic acid amide. | Do. |
| 2-Aminobenzene-1-sulfonic acid-(4'-sulfamidophenyl)-amide ⟶ 1-hydroxynaphthalene-3-sulfonic acid-8-sulfonic acid amide. | Do. |
| Copper-phthalocyanine-tetrasulfonic acid amide. | blue. |
| 2-Aminonaphthalene-4,8-disulfonic acid ⟶ 1 - (3' - sulfophenyl) - 3 - methyl - 5 - amino - pyrazole. | yellow. |

Example 9

29.3 grams of the hydrazone prepared from benzaldehyde and 2-methoxy-4-sulfonamidophenyl-hydrazine are stirred with 300 millilitres of water and dissolved by adding 30 millilitres of soda-lye ($d=1.38$). The solution is cooled to 0° C. and treated with a diazonium solution which was obtained in usual manner from 18.9 grams of 2-amino-1-hydroxybenzene-4-sulfonic acid. After neutralising with hydrochloric acid the formazane thus obtaned is precipitated by the addition common salt and filtered.

For the preparation of the corresponding copper complex compound the residue is stirred with 1000 millilitres of water, heated to 50° C. and treated with the solution of 25 grams of crystalline copper sulfate in 300 millilitres of water. The mixture is then stirred at 50° C. for further 3 hours and the copper complex compound filtered after addition a sodium chloride.

The residue is again pasted with 700 millilitres of water and with 20 millilitres of soda-lye ($d=1.38$) adjusted to the pH value of 11.5; thereto is added a small quantity of a dispersing agent and the mixture cooled down to 0° C. Into this mixture there are sprinkled 20 grams of powdered cyanuric chloride. By the slow addition of soda-lye the solution is kept first at a pH of 10.5–11 and is then stirred for further 4 hours at pH 9.5. The dyestuff formed is precipitated at pH 6 by adding sodium chloride, the filter paste kneaded with 10 grams of sodium bicarbonate and dried under reduced pressure at 40° C. The dyestuff corresponds in the free acid state to the probable formula

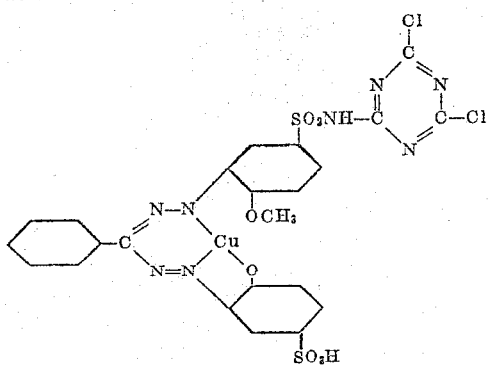

It yields by the working method described in Example 2 on cellulose fabrics blue shades of good fastness to washing.

A dyestuff with similar properties is obtained if for the preparation of the formazane 2-amino-1-hydroxybenzene-4-sulfonamide is used instead of 2-amino-1-hydroxybenzene-4-sulfonic acid.

The copper complex of the dyestuff which is obtained in an analogous manner from benzaldehyde-4-sulfonic acid-(2'-methoxy-4'-sulfonamidophenyl)-hydrazone and diazotized anthranylic acid corresponds to the formula

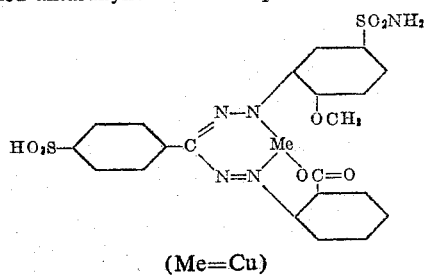

(Me=Cu)

It yields on cellulose greenish blue shades.

Example 10

The copper phthalocyanine sulfochloride obtained in known manner from 58 grams of copper phthalocyanine by reacting with 300 millilitres of chloro sulfonic acid at 130–135° C., which—determined by analysis—contains per 1 molecule of phthalocyanine 3.1 sulfonic acid groups, is added to a mixture of 60 grams of 3-aminobenzene-1-sulfonic acid amide in 300 millilitres of water, the mixture having been warmed to a temperature of 50–60° C. The reaction mixture is kept at pH 4.5–4 by simultaneously adding soda-lye. If the whole amount of sulfochloride is introduced and a consumption of soda-lye can no longer be detected the mixture is heated for a further 1 hour at 90° C. Finally, the hot suspension of the phthalocyanine-sulfonic acid - (3' - sulfonamidophenyl)-amide thus obtained is filtered.

The filter residue is stirred with 2 litres of water and completely dissolved at pH 10.8 by slowly adding dropwise soda-lye. The solution is cooled down to 0° C. and, after adding a small quantity of a dispersing agent, treated with 60 grams of cyanuric chloride in one portion. The alkalinity of the solution is maintained at pH 10.5 by carefully adding soda-lye. If the cyanuric chloride is completely dissolved and a consumption of soda-lye can no longer be detected, sodium bicarbonate is added until a pH of 8.5 is attained; the dyestuff is then precipitated with sodium chloride, filtered and dried under reduced pressure at 40° C.

The product thus obtained corresponds to the probable formula

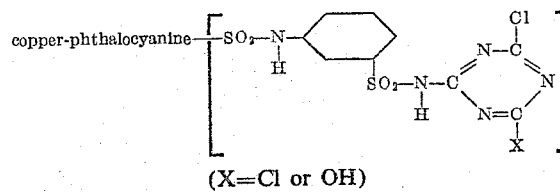

(X=Cl or OH)

It yields on cotton by the method described in Example 2 greenish blue shades of good fastness to washing.

Example 11

48.5 grams of the dyestuff obtained from diazotized 1-aminobenzene-3,5-disulfonamide and 1-hydroxynaphthalene-4-sulfonic acid are dissolved in 500 millilitres of water with weakly alkaline reaction and with warming. After neutralising with acetic acid whereby the dyestuff precipitates to a great extent, the mixture is treated with a hot solution of 30 grams of copper sulfate in 150 millilitres of water (pH of the mixture 4.5). With further heating to 80° C. and simultaneously keeping the mixture by the addition of sodium acetate solution at a pH of 4.5, about 20 millilitres of 30 percent hydrogen peroxide are added dropwise. After a short time the copper complex of the thus formed o,o'-dihydroxy azo dyestuff precipitates in crystals lustering like metals. The reaction has finished if in the filtrate of a cooled sample no starting dyestuff can be detected. The reaction mixture is then cooled down to room temperature and filtered.

The filter residue is heated in admixture with 700 millilitres of water and dissolved by adding soda-lye (pH 11). It is cooled down to 0° C. in an ice-water bath and, after the addition of a small quantity of a wetting agent, treated with 40 grams of finely ground cyanuric chloride. The pH of the solution is kept at 10.5–11 by adding dropwise soda-lye. After about 2 hours the cyanuric chloride is completely dissolved and no further soda-lye will be consumed. The dyestuff is then precipitated by the addition of sodium chloride, isolated by filtration and dried.

It dyes cellulose fabrics by the working method described in Example 2 in blueish red shades having good wet fastness properties.

Example 12

57.6 grams of (0.1 mol) of 1,4-di-(p-toluylamino)-anthraquinone are converted into the corresponding disulfochloride and then treated with an aqueous ammonia solution to yield the disulfonamide. The dyestuff thus obtained is stirred with 1500 millilitres of water and dissolved by the addition of soda-lye (pH value of the solution 11.5). After cooling to 0° C. in an ice-sodium chloride bath an aqueous solution of 0.5 gram of the reaction product of 1 mol of stearyl alcohol and 20 mols of ethylene oxide and then 40 grams of cyanuric chloride are added by sprinkling in.

The pH value of the reaction mixture falls after a short time; it is kept at 10.5–10.8 by adding dropwise soda-lye. If the cyanuric chloride is completely dissolved the solution is clarified and subsequently the dyestuff salted out by adding sodium chloride. It yields on cotton by the working method described in Examples 2 and 5 blue dyeings and prints having excellent fastness to washing.

*Example 13*

A cotton fabric is treated with an aqueous 2 percent sodium carbonate solution. After drying the fabric is printed with a printing paste composed of 30 grams of the dyestuff described in Example 5, 150 grams of urea, 450 grams of sodium alginate solution (40:1000) and 750 millilitres of water. The print thus produced is dried, subsequently heated to 110–160° C. and then rinsed and soaped. It yields yellow shade having good fastness to washing.

We claim:
1. Dyestuffs corresponding to the formula

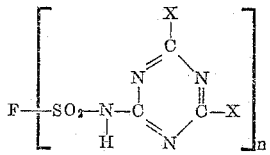

wherein F stands for the residue of an organic dyestuff selected from the group consisting of metal complex azo, azo, phthalocyanine, anthraquinone, oxazine, dioxazine and triphenyl methane, one X means a halogen atom, the other X stands for a member selected from the group consisting of a halogen atom and a hydroxyl group, and $n$ stands for an integer from 1 to 4.

2. A cellulose-containing textile material which has been colored with a dyestuff of claim 1 and then treated with an acid-binding agent and at elevated temperature.

3. A cellulose-containing textile material which has been colored with a dyestuff of claim 1 in the presence of an acid-binding agent and subsequently subjected to elevated temperature.

4. A cellulose-containing textile material which has been treated with an acid-binding agent, then colored with a dyestuff of claim 1 and subjected to an elevated temperature.

5. A dyestuff of claim 1 wherein F is the residue of an azo dyestuff.

6. A dyestuff of claim 1 wherein F is the residue of phthalocyanine dyestuff.

7. A dyestuff of claim 1 wherein F is the residue of anthraquinone dyestuff.

References Cited in the file of this patent

UNITED STATES PATENTS

| | | |
|---|---|---|
| 1,886,480 | Haller et al. | Nov. 8, 1932 |
| 1,950,952 | Richard | Mar. 13, 1934 |
| 2,459,771 | Fox | Jan. 18, 1949 |
| 2,638,403 | Stead et al. | May 12, 1953 |
| 2,814,614 | Zickendraht | Nov. 26, 1957 |
| 2,873,269 | Fasciati et al. | Feb. 10, 1959 |
| 2,891,940 | Fasciati et al. | June 23, 1959 |
| 2,892,671 | Alsberg et al. | June 30, 1959 |
| 2,892,828 | Stephen | June 30, 1959 |

FOREIGN PATENTS

| | | |
|---|---|---|
| 2,630/57 | South Africa | Aug. 1957 |